United States Patent
Groman

(10) Patent No.: US 9,707,712 B2
(45) Date of Patent: Jul. 18, 2017

(54) BLOW MOLDING TECHNIQUES

(71) Applicant: Boaz Barry Groman, Boca Raton, FL (US)

(72) Inventor: Boaz Barry Groman, Boca Raton, FL (US)

( * ) Notice: Subject to any disclaimer, the term of this patent is extended or adjusted under 35 U.S.C. 154(b) by 579 days.

(21) Appl. No.: 13/721,094

(22) Filed: Dec. 20, 2012

(65) Prior Publication Data

US 2014/0175710 A1 Jun. 26, 2014

(51) Int. Cl.
| | | |
|---|---|---|
| B29D 22/00 | (2006.01) | |
| B29C 49/78 | (2006.01) | |
| B29C 47/00 | (2006.01) | |
| B29C 47/92 | (2006.01) | |
| B29C 49/04 | (2006.01) | |

(52) U.S. Cl.
CPC .......... B29C 49/78 (2013.01); B29C 47/0023 (2013.01); B29C 47/0054 (2013.01); B29C 47/0076 (2013.01); B29C 47/92 (2013.01); B29C 49/04 (2013.01); B29C 2049/042 (2013.01); B29C 2947/926 (2013.01); B29C 2947/92647 (2013.01); B29C 2947/92942 (2013.01)

(58) Field of Classification Search
None
See application file for complete search history.

(56) References Cited

U.S. PATENT DOCUMENTS

| | | | | |
|---|---|---|---|---|
| 3,519,705 | A | * | 7/1970 | Pannenbecker ......... B29C 49/38 264/525 |
| 4,026,983 | A | * | 5/1977 | Stockwell ........... B29C 49/4242 264/295 |
| 4,144,013 | A | | 3/1979 | Simmons |
| 4,153,408 | A | * | 5/1979 | Albert et al. ................. 425/532 |
| 4,560,340 | A | | 12/1985 | Younkin et al. |
| 4,882,104 | A | * | 11/1989 | Dobrowsky .......... B29C 47/862 264/209.1 |
| 5,587,125 | A | | 12/1996 | Roychowdhury |
| 5,891,385 | A | * | 4/1999 | Cerbelle et al. .............. 264/515 |
| 7,607,972 | B2 | | 10/2009 | Groman |
| 2007/0252312 | A1 | * | 11/2007 | Lonsway ...................... 264/523 |
| 2009/0250848 | A1 | * | 10/2009 | Gupta .......................... 264/540 |

(Continued)

OTHER PUBLICATIONS

Blow Molding, Packaging Technology, 2012 (http://packaging-technology.org/35-blow-molding.html), date unknown, 26 pages.

(Continued)

*Primary Examiner* — Monica Huson
(74) *Attorney, Agent, or Firm* — Gerald E Linden

(57) ABSTRACT

In blow mold apparatus, the emergence of a parison from an extruder may be controlled (the parison supported), such as by pulling on the parison or resisting gravity pull to tailor parison wall thickness, overall and locally. The process may proceed discontinuously, such as by stopping extrusion before a parison has achieved its full desired length and continuing pulling. After molding the parison, it may be filled with a material (solid, liquid or gas). A subsequent parison may be molded onto a previously formed parison. Various elements or devices (such as needles, caps, stoppers, valves, plungers) may be incorporated into the part during the molding process.

23 Claims, 11 Drawing Sheets

Grip Parison-1

(56) References Cited

U.S. PATENT DOCUMENTS

2012/0205038 A1   8/2012   Sumi et al.

OTHER PUBLICATIONS

Extrusion Blow Molding, from "A Guide to Injection Moulding of Plastics", Prabodh C. Bolur, (http://www.pitfallsinmolding.com/blomolding.html), date unknown, 10 pages.
International Search Report and Written Opinion from corresponding PCT/US2013/062977, dated Mar. 5, 2014.

* cited by examiner gravity pull micro-abrasive blasting device as shown in US 7,607,972

Overall System

Position Needle

Start Position

Commence Extrusion

Grip Parison-1

Pulling Parison-1

Retract Needle

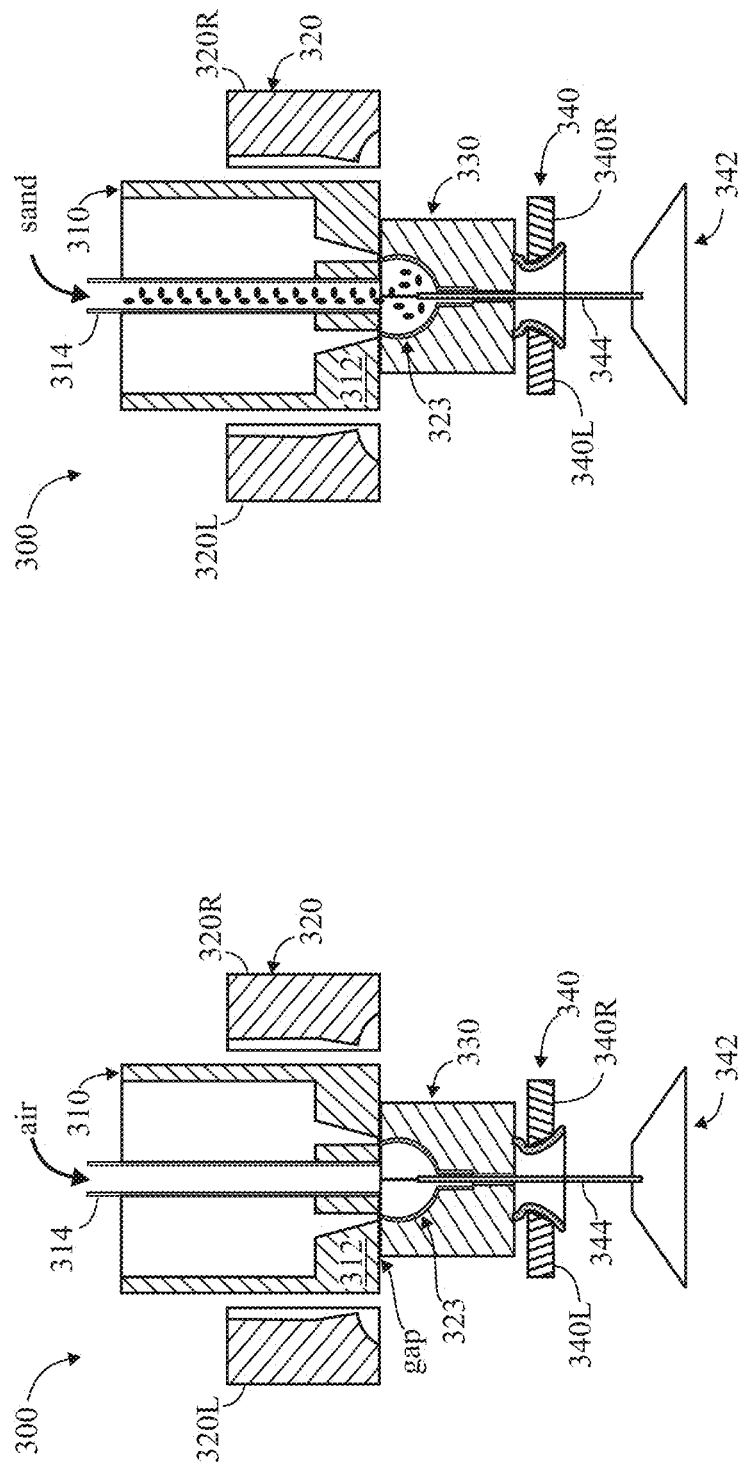

Pull Parison-2

Second Extrusion

Separation

Second Blow

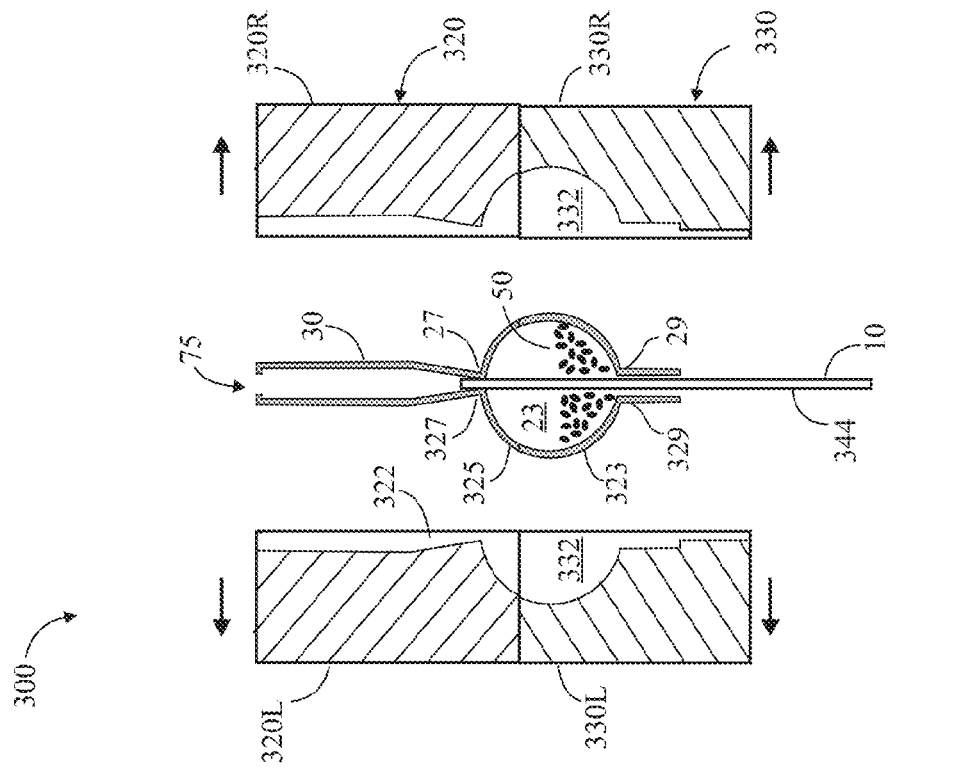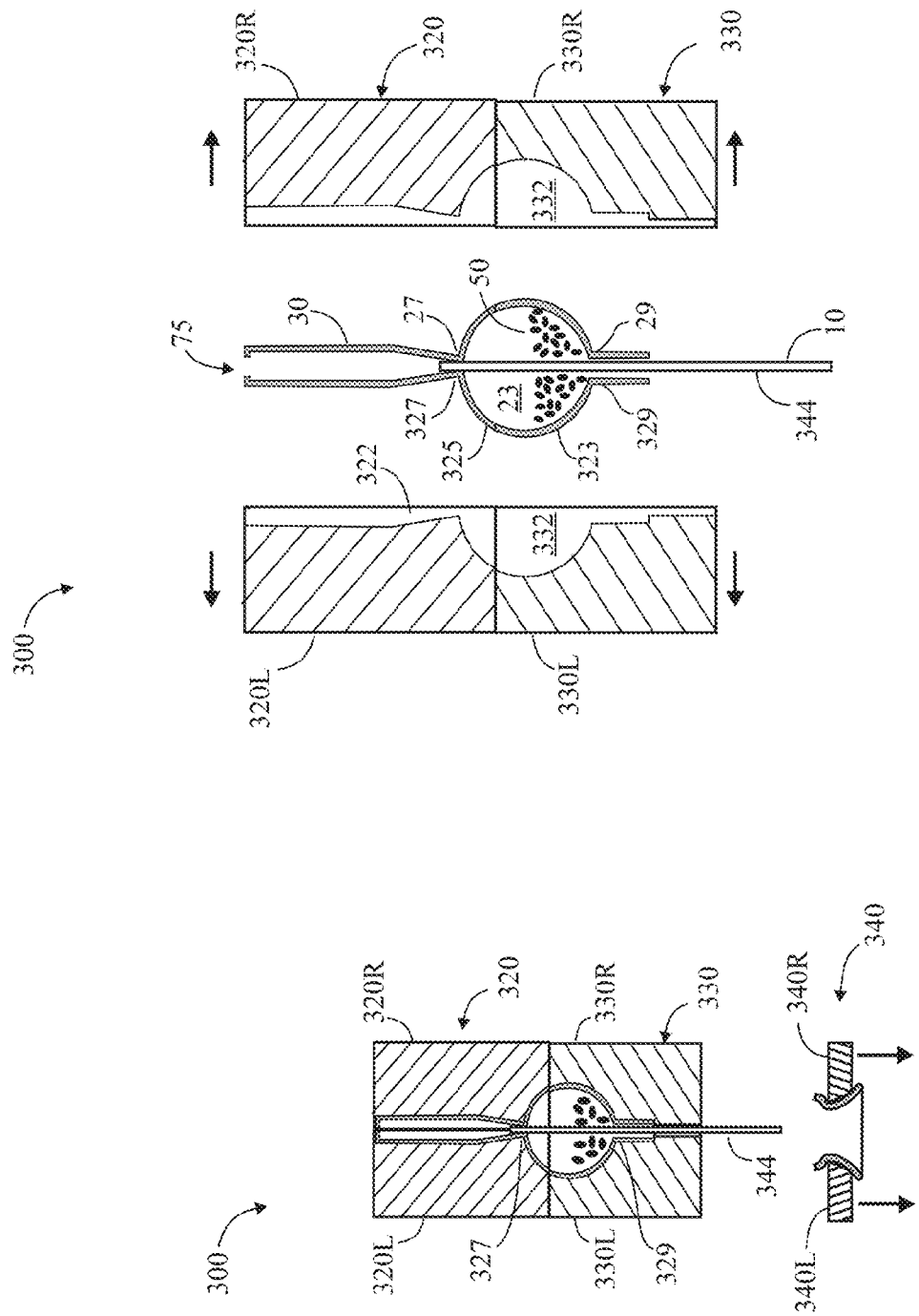

BLOW MOLDING TECHNIQUES

CROSS-REFERENCE TO RELATED APPLICATION(S)

Priority is claimed from provisional application 61/711,757 filed Oct. 10, 2012.

TECHNICAL FIELD

The invention relates to blow molding techniques, including method(s), apparatus(es) and system(s), and to products produced by the techniques.

BACKGROUND

Blow molding techniques are commonly used to produce hollow three-dimensional articles such as containers (for example bottles, etc.), typically from thermoplastics materials which are available as granules, pellets or powders. A blow molding apparatus will typically have a two-piece mold, each mold half having recesses on their inner (facing) surfaces which, when the mold is closed, forming a cavity having the desired shape of the molded article.

A typical blow molding process may include the following sequence of steps:
  first softening the granules or powder of thermoplastic material may in a plasticising cylinder;
  then extruding the thermoplastic material into a tube or "parison", which may extend generally vertically from a bottom of an extruder;
  surrounding the soft, warm parison with the open mold;
  closing the mold to seal the lower end of the parison; and inflating the parison pneumatically (from its top end) to expand it into the mold cavity;
  contact of the expanded parison with the mold cavity may result in rapid cooling of the thermoplastic material.

FIG. 1 illustrates a basic blow-molding technique 100. A parison 150 of heated plastic material is extruded from and exits the bottom of an extruder. The extruded parison is elongate and tubular, and as it is being extruded it is "pulled" by gravity. The parison is located between two halves 120L and 120R of a mold, the inner surfaces of which have a cavity (dashed lines) in the form of the external surface of desired molded part (such as a bottle). When the parison has sufficient length (it is shown already elongated), the mold closes on the parison. The bottom of the parison is pinched off by the bottom of the mold. A blow pin 114 extends from the extruder into the top of the parison, and the top of the mold seals the parison around the blow pin. Pressurized air blown through the blow pin into the parison expands the parison into the cavity of the mold, conforming thereto. Molding also cools the plastic. The mold is opened, and the resulting molded part is extracted therefrom. A more complete description can be found in Blow Molding, Packaging Technology, 2012, (http://packaging-technology.org/35-blow-molding.html), 26 pages, incorporated by reference herein. See also Extrusion Blow Molding, from "A Guide to Injection Moulding of Plastics", Prabodh C. Bolur, (http://www.pitfallsinmolding.com/blomolding.html), 10 pages, incorporated by reference herein.

Using blow molding apparatus such as described above, the outside dimensions of the resulting part can be accurately determined, but part wall thickness, and its distribution, depends on the size of the parison and the geometry of the mold. The resulting part wall thickness also depends on the length and weight of the parsion extruded prior to forming the part, because gravity pull thins the wall thickness at the top of the parison as it is pulled by the weight of the already extruded material at the bottom of the parison.

SUMMARY

It is an overall object of the invention(s) to provide improved techniques for blow molding, including better control over resulting part wall thickness. It is another object of the invention(s) to provide the ability to manufacture more complex blow molded parts, including filling chambers of molded parts with liquids or powders, molding parts having two chambers containing various materials which may be combined prior to dispensing (such as epoxies, medications, etc.), and adding devices such as valves, closures, and the like, resulting complete assemblies.

According to the invention, generally, in blow mold apparatus, the emergence of a parison from an extruder may be controlled (the parison supported), such as by pulling on the parison or resisting gravity pull to tailor parison wall thickness, overall and locally. The process may proceed discontinuously, such as by stopping extrusion before a parison has achieved its full desired length and continuing pulling. After molding the parison, it may be filled with a material (solid, liquid or gas). A subsequent parison may be molded onto a previously formed parison. Various elements or devices (such as needles, caps, stoppers, valves, plungers) may be incorporated into the part during the molding process.

Some of the techniques disclosed herein may include, but are not limited to:
  supporting and guiding the parison as it is being extruded
  controlling wall thickness of the parison as it is being extruded
  stopping and resuming extrusion during the overall process of molding a part
  mounting (incorporating) an element (or device) to the part as it is being blow molded
  forming a parison on a previously formed portion of the blow molded part
  filling a blow molded part before the completion of the overall molding process According to an embodiment of the invention, a method of blow molding a part comprising extruding a parison may be characterized by supporting the parison as it is being extruded. Supporting the parison may comprise one or more of: gripping or grasping or attaching to the parison as it is being extruded; pulling on at least a portion of the parison as it is being extruded; supporting the end of the parisonor as it is being extruded; guiding the parison as it is being extruded; manipulating a position of at least the free end of the parison as it is being extruded; controlling the emergence of the parison from the extruder; resisting the elongation of the parison due to gravity; sticking the parison to a sacrificial element; sticking the parison to an element which will become integral with the part; and sticking the parison to a previously formed portion of the part. A wall thickness of the parison may be controlled as it is being extruded. An element or device or tool may be inserted into the parison prior to molding. The element or device or tool may comprise one of: a cap, valve, plunger or the like; and a tool for defining an inner surface of the part. During blow molding the part, before the part is completed, the parison may be filled with a material. During blow molding the part, air or material from within the part may be evacuated. A rate at which the parison is being pulled may be controlled independent of and relative to the rate at which it is being extruded. Before the parison has reached a desired length, the rate of extrusion may be reduced to substantially zero while continuing pulling the parison.

According to an embodiment of the invention, a method of blow molding a part comprising extruding a first parison and inflating the first parison into a cavity of a first mold may be characterized by: extruding a second parison onto an end of the molded first parison; and inflating the second parison into a second mold. Prior to extruding the second parison, the first parison may be filled with a material. An element may be disposed between the first and second parisons. An an element, device or tool may be disposed in at least one of the first and second parisons. Different plastic materials may be used for the first and second parisons.

According to an embodiment of the invention, an overall process for blow molding a part may comprise: extruding a parison; stopping extruding; and molding the parison. The process may further comprise resuming extruding. Before resuming extruding, the molded parison may be filled.

According to an embodiment of the invention, a blow molding method may comprise: extruding a parison having a length and a thickness; and controlling the thickness of the parison, as it is being extruded. The thickness of the parison may be controlled locally along its length, as it is being extruded. The thickness of the parison may be controlled to be thicker where it needs to expand more into a mold. The thickness of the parison may be controlled by pulling on the parison as it is being extruded. The thickness of the parison may be increased to provide increased wall thickness, including completely filled, at selected positions of a resulting molded part.

According to an embodiment of the invention, a blow-molded part may be formed by any of the methods or processes disclosed (and/or claimed) herein.

According to an embodiment of the invention, a blow molding apparatus may comprise: an extruder; and a mold; and may be characterized by: means for supporting a parison during extruding. The means for supporting may be selected from the group consisting of a tool gripping an end portion of the parison being extruded, the top of a previously-formed parison, an element to which the parison can be adhered and an element extending into the parison. The apparatus may further comprise: means for filling the parison before it is removed from the molding apparatus.

According to an embodiment of the invention, a method of blow molding a part, may comprise: extruding and molding a parison; while performing at least one of extruding and molding a parison, combining a mechanical element or device into the part. The part may be a micro-abrasive blasting device; and the mechanical element may be a retractable needle.

According to an embodiment of the invention, a method of controlling inner dimensions of a blow-molded part may comprise: inserting an element into an end of the parison prior to molding.

Supporting the parison as it is being extruded is but one feature that distinguishes the technique(s) disclosed herein from conventional blow molding techniques, such as described with respect to FIG. 1, wherein the parison extrudes from the bottom of the extruder and experiences a "gravity pull".

Supporting, as used herein may include any one or more of the following:
- gripping or grasping the parison as it is being extruded
- attaching or sticking to the parison as it is being extruded
- pulling on at least a portion of the parison as it is being extruded
- guiding the parison as it is being extruded
- manipulating the position of the parison as it is being extruded
- resisting the elongation of the parison due to gravity as it is being extruded
- inserting an element or device (or a tool) into the parison as it is being extruded
- controlling the emergence of the parison from the extruder, including controlling the rate at which the parison develops independently of the rate at which it is being extruded Other objects, features and advantages of the invention(s) may become apparent from the following description(s) thereof.

BRIEF DESCRIPTION OF THE DRAWINGS

Reference will be made in detail to embodiments of the disclosure, non-limiting examples of which may be illustrated in the accompanying drawing figures (FIGs). The figures are generally diagrams. Some elements in the figures may be exaggerated (or shown not to scale), others may be omitted, for illustrative clarity. In the descriptions of the figures, terms such as "left" and "right", "top" and "bottom", "upper" and "lower" may be used to guide the reader, but should be understood not to limit the apparatus being described to any particular configuration or orientation, unless otherwise specified or evident from context.

DETAILED DESCRIPTION

Various embodiments will be described to illustrate teachings of the invention(s), and should be construed as illustrative rather than limiting. Although the invention is generally described in the context of various exemplary embodiments, it should be understood that it is not intended to limit the invention to these particular embodiments, and individual features of various embodiments shown and described herein may be combined in various ways with one another.

In the main hereinafter, a blow molding apparatus configured for blow molding a micro-abrasive dental blasting device such as described in commonly-owned U.S. Pat. No. 7,607,972 will be described, as exemplary of some of the techniques disclosed herein. However, it should be understood that the techniques may have applicability to other products and applications for blow molding, that certain steps may be omitted, others repeated, yet others added to realize such other products and applications.

Figure 1:
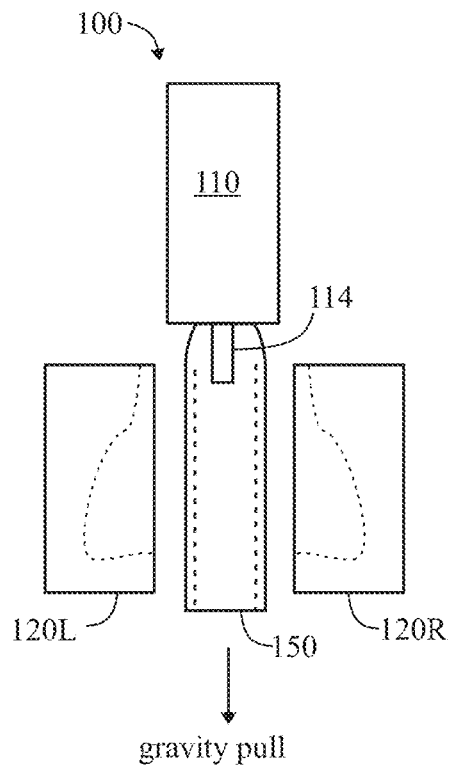
FIG. 1 is an illustration of a prior art blow molding process.
Figure 2:
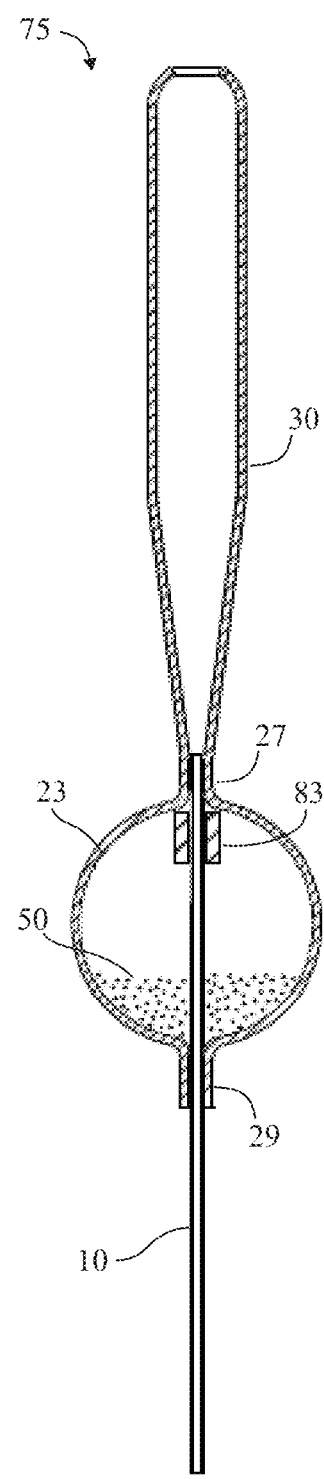
FIG. 2 is a diagram of an exemplary part which may be made using the techniques disclosed herein. Compare FIG. 5A of U.S. Pat. No. 7,607,972.

FIG. 2 shows a micro-abrasive dental blasting device 75 having the following elements which may be discussed herein: discharge conduit 10, mixing chamber 23, inlet port 27, discharge port 29, delivery conduit 30, particulate matter 50, discharge conduit stop 83. This figure shows the discharge conduit (needle) 10, pushed into the device, sealing the particulate matter 50 in the mixing chamber 23. In use, the discharge conduit 10 is pulled out, limited by the stop 83, so that air entering the delivery conduit agitates the particulate matter 50 which ejects from the bottom of the discharge conduit 10. See FIGS. 5 (5A and 5B) of U.S. Pat. No. 7,607,972, the descriptions of which are incorporated by reference herein.

An Exemplary Blow Molding System

Figure 3:
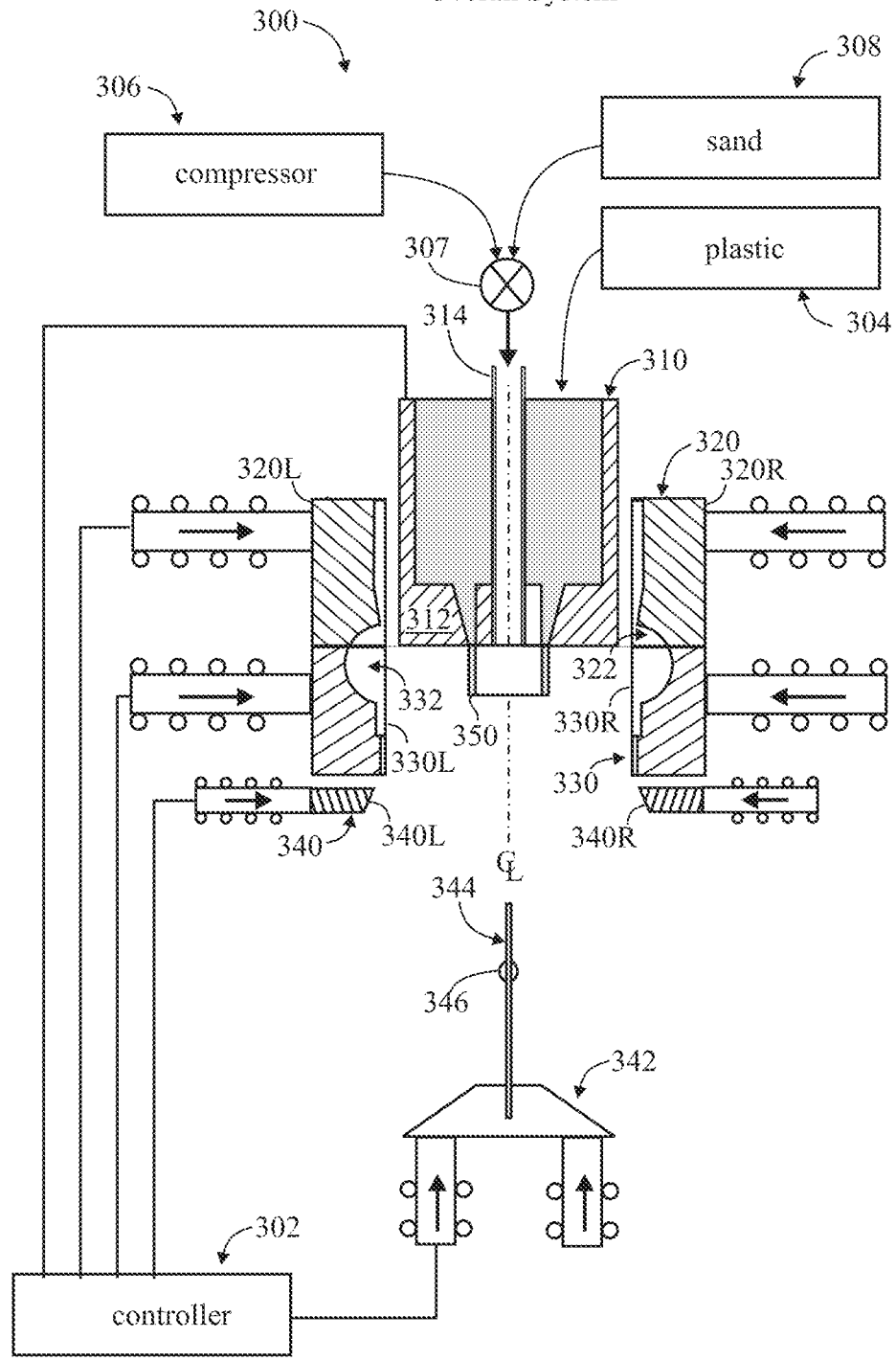
FIG. 3 is a diagram of a blow molding apparatus, according to an embodiment of the invention.

FIG. 3 shows a blow molding system 300 configured to manufacture the exemplary micro-abrasive dental blasting device 75. The system comprises an extruder 310, a top mold 320 and a bottom mold 330, and a pull gripper 340. A needle gripper 342 may also be provided. These components are generally movable with respect to one another, their operation being coordinated by a controller 302. Typically, the extruder 310 may be much larger than the molds 320, 330, and will remain stationary while the molds and other components are moved.

A supply 304 of plastic material for the parison is provided. A compressor 306 supplies compressed air for inflating the parison. A supply 308 of material ("sand", compare particulate matter 50) is provided for filling the part as it is being formed. A selector valve 307 may allow either air or sand to be provided, via a fill tube 314, to the part being molded. Gases other than air, such as nitrogen may be used.

The extruder 310 warms the plastic material, and ejects (feeds, pushes) the warmed plastic material out from an opening on its bottom surface, producing a tubular parison 350 which will be expanded by air pressure into the top and bottom molds. The cross-section of the parison may be circular, oval, rectangular, etc. The tapered openings at the bottom of the extruder may constitute a nozzle 312 which is removable, replaceable and/or adjustable.

As described in greater detail hereinbelow, two (or more) parisons may be produced in the process of forming one overall blow-molded part. A fill tube 314 extends through the extruder 310 for inflating and filling the parison(s).

The top mold (mold set) 320 has two halves—a left half 320L and a right half 320R—and may be provided with a cavity 322 on its internal surface(s) to produce the delivery conduit 30 of the micro-abrasive blasting device 75, and a top portion of the mixing chamber 23, including the inlet port 27 of the micro-abrasive blasting device 75. Actuators are shown for moving the top mold halves, such as together and apart from one another. The top mold halves may also be moved up and down.

The bottom mold (mold set) 330 has two halves—a left half 330L and a right half 330R—and may be provided with a cavity 332 on its internal surface(s) to produce a bottom portion of the mixing chamber 23, including the discharge port 29 of the micro-abrasive blasting device 75. The bottom mold 330 is disposed below the top mold 320, generally concentric therewith. Actuators are shown for moving the bottom mold halves, such as together and apart from one another. The bottom mold halves may also be moved up and down.

The pull gripper 340 has two halves—a left half 340L and a right half 340R—is disposed below the extruder 310, and is operable (as a tool) to grip the parison, such as at its bottom end. Actuators are shown for moving the pull gripper halves, such as together and apart from one another. The pull gripper may also be moved up and down.

The needle gripper 342 is shown gripping a needle 344 which may constitute the discharge conduit 10 of the micro-abrasive blasting device 75. The needle may be a small diameter metal tube, having open ends, and region of increased diameter disposed on its outer surface, such as a small "dab" 346 of epoxy, to provide the function of the discharge conduit stop 83 of the micro-abrasive blasting device 75. (Alternatively, the needle may be swaged to increase its diameter at a selected position.) Actuators are shown for manipulating the needle gripper, such as for inserting the needle 344 into the parison.

An Exemplary Process Flow

Figure 3A:
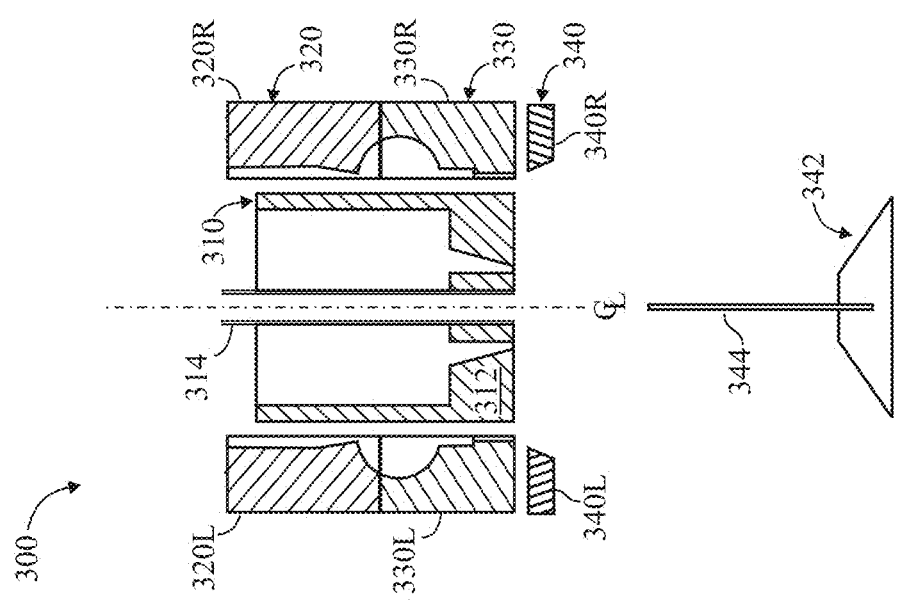
Figure 4:
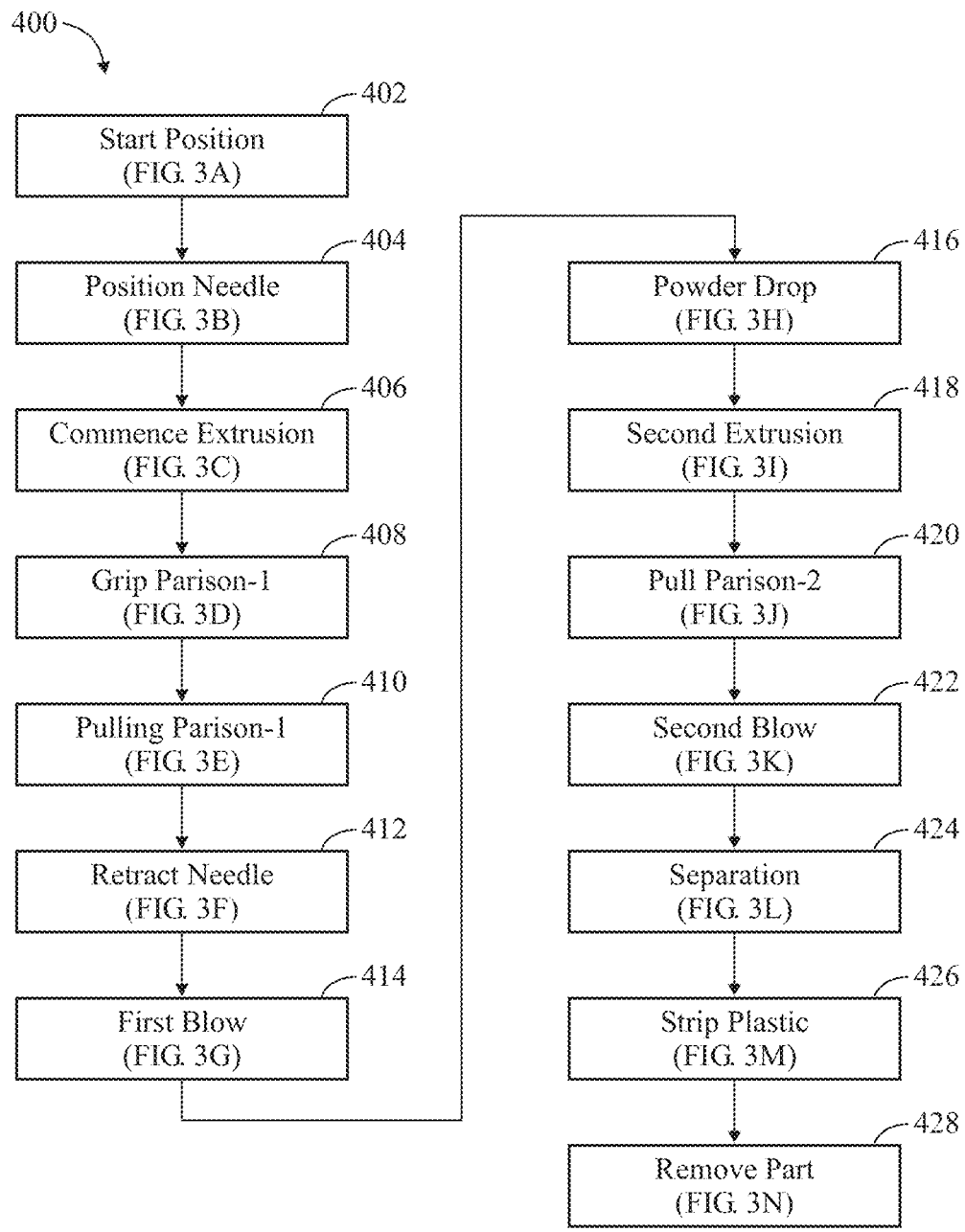
FIG. 4 is a flowchart listing steps in the process illustrated in FIGS. 3A-3N.

A process flow for forming the exemplary micro-abrasive blasting device 75 is illustrated and described, in a sequence of steps. FIGS. 3A-3N show the arrangement (relative positions) of the components 310, 320, 330, 340, 342 (and needle 344) in some of these steps. The actuators for the top and bottom mold halves 320 and 330, the pull gripper 340 and the needle gripper 342 (as well as the controller 302 plastic supply 304 compressor 306 and sand supply 308) are omitted from these figures, for illustrative clarity. FIG. 4 lists the "steps" of the exemplary process flow 400, as described hereinbelow.

Start Position

FIG. 3A shows (step 402) the components in an initial "start" position, arranged as follows:

| Element | description |
|---|---|
| Extruder | positioned between top and bottom mold halves |
| Parison | no parison yet (extrusion not started) |
| Top Mold | mold halves are open (apart from one another) |
| Bottom Mold | mold halves are open (apart from one another) |
| Pull Gripper | gripper halves are open (apart from one another) |
| Needle | positioned away from (below) bottom mold |

The bottom of the extruder is approximately even with the bottom of the bottom mold. This may be achieved either by the molds moving up, or the extruder moving down, or both.

Position Needle

Figure 3B:
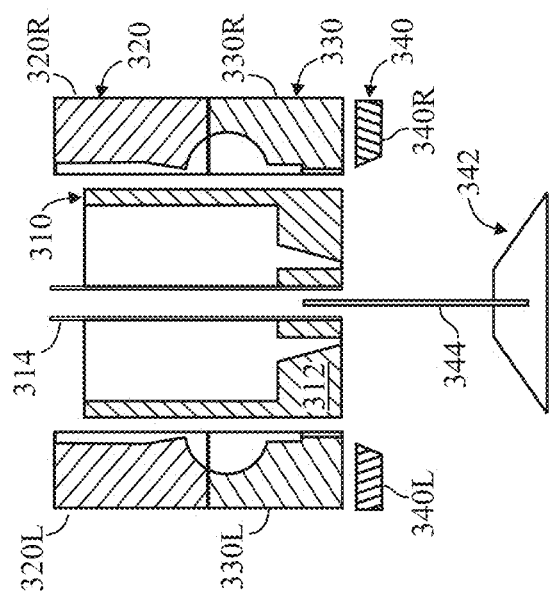
FIGS. 3A-3N are diagrams of the apparatus of FIG. 3 in operation, at various stages in the process of forming a blow molded part such as the exemplary part shown in FIG. 2.

FIG. 3B shows (step 404) that the needle gripper 342 moves the needle 344 upward, so that a top end portion of the needle is located within a bottom end portion of the fill tube 314. This will protect the needle from getting clogged with plastic when it is extruded (next step). In the descriptions that follow, three dots ( . . . ) indicates no change from previous step.

| Element | description |
|---|---|
| Extruder | . . . |
| Parison | . . . |
| Top Mold | . . . |
| Bottom Mold | . . . |
| Pull Gripper | . . . |
| Needle | raised, with its tip extending into bottom of fill tube |

Commence Extrusion

Figure 3C:
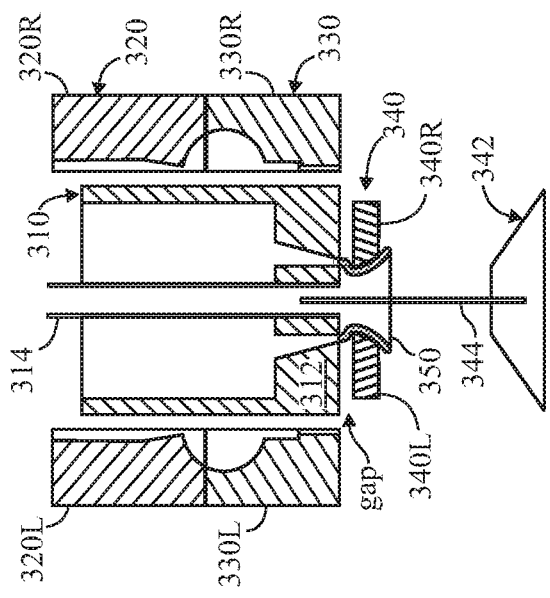

FIG. 3C shows (step 406) the beginning of extrusion, and the parison 350 ("Parison-1") can be seen emerging from the bottom of the extruder 310. The parison should extend a sufficient distance below the bottom of the extruder so as to be available for gripping by the pull gripper 340, which is illustrated in an open position abreast of the free end of the parison 350.

| Element | description |
|---|---|
| Extruder | operating (extrusion started) |
| Parison-1 | extending from bottom of extruder |
| Top Mold | . . . |
| Bottom Mold | . . . |
| Pull Gripper | . . . |
| Needle | . . . |

Notice that Parison-1 is just beginning to form, and has only a short length, less than its final length. The gray shading indicates plastic material. (A showing of plastic material in the extruder is shown in FIG. 3, but is omitted from FIGS. 3A-3H, for illustrative clarity.)

Notice that the needle 344 may extend inside the parison as it begins (and continues) to emerge from the extruder. In this manner, the needle 344 may subsequently guide and control the position of at least a portion (such as the bottom end) of the parison to keep it from "wandering" side-to-side as it is being extruded.

Grip Parison-1

Figure 3D:
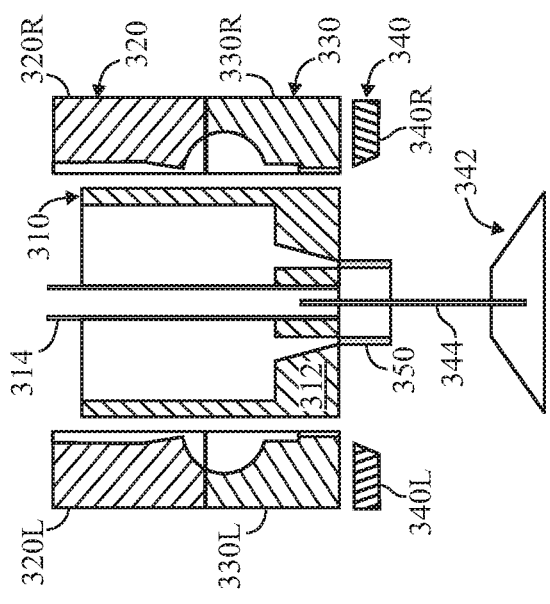

FIG. 3D shows (step 408) the pull gripper 340 closing on (pinching) the partially-formed parison 350. There may be a gap between the top of the pull gripper and the extruder 310 to avoid shearing the parison when gripping it. The inner surfaces of the pull gripper halves 340L, 340R may be suitably shaped, such as tapered (as shown) to deform and securely grasp the portion of the parison being gripped for supporting or pulling. A small portion of the parison may extend beyond (below) the pull gripper. The pull gripper halves may have tapered or conical contours on their inner faces for securely gripping (grasping) the portion of the parison which it engages. The pull gripper may support a tapered feature of a shape similar to the tubular parison cross-section, but of reduced size, to ensure robust gripping. This gripped portion of the parison may (or may not) compressed onto the needle 344, and may cool on contact with the pull gripper.

| Element | description |
|---|---|
| Extruder | . . . |
| Parison-1 | . . . |
| Top Mold | . . . |
| Bottom Mold | . . . |
| Pull Gripper | closes on (pinches) parison-1 cools/hardens parison |
| Needle | extends into parison-1 |

At this stage in the process, the nascent parison may be supported by the needle which is inside the parison, and the pull gripper grasping the outside of the parison (and bearing down on the needle inside). If the needle is not needed (for example), the pull gripper can function, by itself, to support, pull and guide the emerging parison. If desired, an additional element or device (see FIG. 5A) may be inserted into the end of the parison before it is gripped.

Pulling Parison-1

Figure 3E:
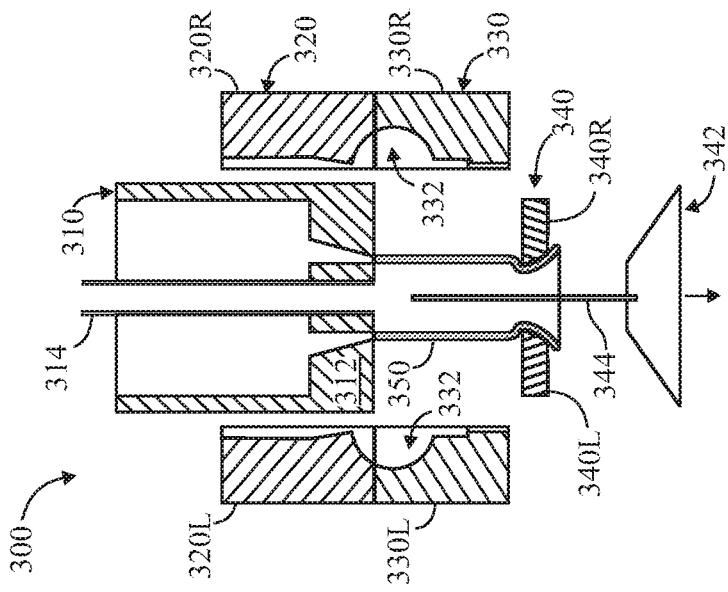

FIG. 3E shows (step 410) that the pull gripper 340 and molds 320, 330 move downward (relative to the extruder 310, or vice-versa). This pulls the parison 350 as it is being extruded. This pulling (and extruding) continues until the parison 350 is sufficiently long to be molded by the bottom mold 330. In other words, the length of the parison 350 between the extruder 310 and the pull gripper 340 is at least equal to the height (vertical in the figure) of the bottom mold 330.

By pulling on the parison while it is being extruded, the thickness of the parison may be well controlled, substantially independently of the rate at which it is being extruded. In this manner, the parison may be thicker in areas where it needs to expand more (into the mold), and thinner in areas where is needs to expand less, resulting in control over the thickness of the molded part. The parison wall thickness can be controlled (tailored) based on part shape (some areas having a greater diameter than others) to provide more uniform thickness in the resulting molded part. The thickness of the parison can be locally controlled, to provide increased wall thickness, including completely filled, at selected positions of the resulting part.

With reference to the micro-abrasive blasting device 75, the process permits the ability to provide thicker walls where required, such at the major bulb diameters in order to resist the air pressure supplied (to the device, in use). And the ability to add more material for the location(s) where the needle is surrounded with material in order to create a seal.

The rate (distance divided by time) at which the parison is pulled ("pull rate") may be less than, equal to, or greater than the rate at which the parison is being extruded ("feed rate"), either or both of which rates may be varied during parison formation. For example, when the parison is nearly (such as 90%) completed (before it has reached its desired rate), the feed rate can be reduced (such as to substantially zero), taking pressure off of the extruder/nozzle, the remaining growth (elongation) of the parison being controlled substantially entirely by its continuing to be pulled. By eliminating pressure before the parison is completed, the extrusion may be stopped, without dripping (and restarted for the next parison or part).

By gripping (or grasping) the parison, supporting it as it is being extruded, in contrast with a conventional "gravity pull" (unsupported extrusion), various benefits may be realized, such as the parison can be pulled at a rate greater than the rate at which it is emerging from the extruder, resulting in a thinner parison wall (and consequently thinner part wall)

the parison may be supported to resist the conventional "gravity pull", slowing down its elongation rate, thereby resulting in a thicker parison wall (and consequently thicker part wall)

greater and lesser wall thickness can be achieved at various positions (locally) in a single parison by supporting and pulling the parison at various times during its emergence from the extruder in either case (pulling or resisting), the position of the parison is better controlled and its wall thickness can be controlled the pull gripper 340 grips and supports or pulls the parison as it is being extruded the needle 344 also controls the position of the parison relative to the surrounding mold(s), which is nominally concentric. Inserting the needle may be considered to be supporting or gripping the parison from the inside (its bore)

in addition to supporting/pulling, the position of the parison could be moved off-center, if desired In this manner, the thickness of the parison may be controlled and tailored to accommodate subsequent expansion (during blow).

In conjunction with pulling or supporting the parison (controlling elongation of the parison external to the extruder), the rate at which it is being extruded (emerging from the extruder) can also be controlled, including adjusting a feed rate, adjusting the size of orifices in the nozzle of the extruder, etc. The ability to thin the parison as it is being extruded by pulling it, permits the use of a less restrictive extruder nozzle, which may substantially reduce the required extrusion pressures and temperatures, thereby facilitating the use of a smaller and less expensive extruder.

For the micro-abrasive blasting device 75, the needle 344 constitutes an element (discharge conduit 10) of the resulting molded part. The needle may be considered to be representative of any device (such as a valve, a plunger, a stopper, or the like), which is in addition to the plastic itself, and which ultimately becomes an integral part of the final product. (Note that in U.S. Pat. No. 7,607,972 the needle serves a function as a valve, as well as a delivery "nozzle".)

Notice that the needle 344 extends into the parison 350, and may be considered to be representative of any element or device that can be used to deliver material into (or to extract material from) the parison. After serving such a purpose (delivery or extraction), the needle (or other device) may be left in place, or it may be withdrawn.

Notice that the needle 344 may extend completely through the parison 350, and may be considered to be representative of any element or device that can be used as a tool to establish a shape for the inside of the parison when it is clamped, or molded. After serving such a purpose, the needle (or other device) may be withdrawn (more typical), or left in place (less typical).

| Element | description |
|---|---|
| Extruder | . . . |
| Parison-1 | being pulled (or restrained) |
| Top Mold | . . . |
| Bottom Mold | . . . |
| Pull Gripper | grasping and pulling down (or pushing up) on parison-1 |
| Needle | . . . |

Notice the cavity 332 in the bottom mold halves. (FIG. 3J shows the cavity 322 in the top mold halves.) The cavities 332, 322 (and resulting portion of the molded part formed in the respective cavity) may exhibit "radial symmetry" (a vertical cut through the axis in any of two or more planes produces two halves that are mirror images of each other). The micro-abrasive blasting device 75 exhibits radial symmetry. For "mirror symmetry", the two cut halves are mirror images of each other if cut through the axis in only one unique plane. The cavities 332, 322 and resulting molded parts may have no symmetry, and portions of the molded part may cross over the centerline (CL).

Retract Needle

Figure 3F:
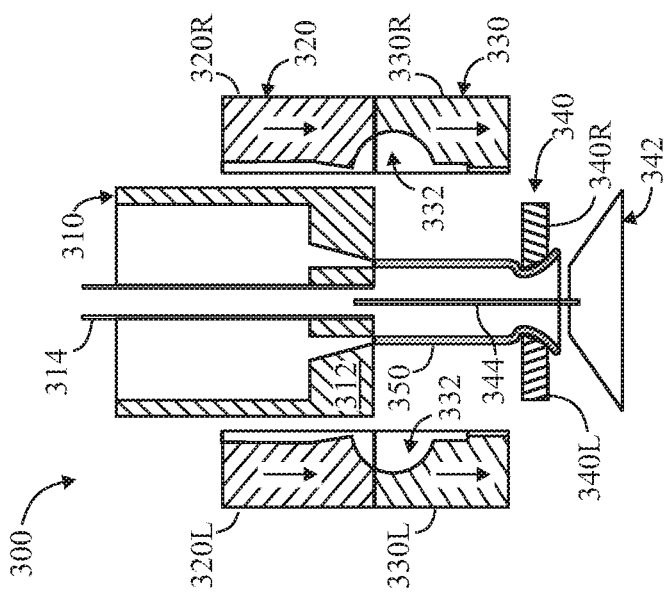
Figure 3J:
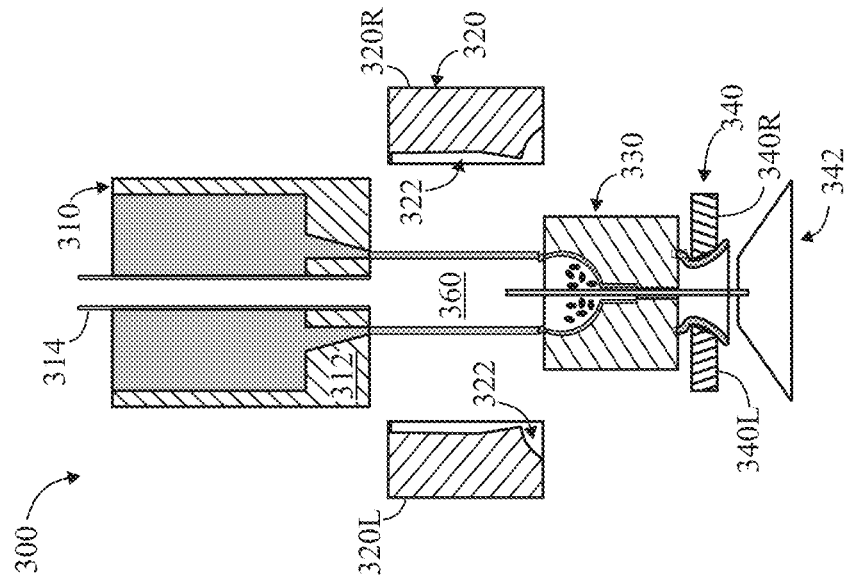

FIG. 3F shows (step 412) that the needle 344, which may (or may not) be extending during the previous few steps into the fill tube 314, may be moved (downward), so as to be out the fill tube during a subsequent step (FIG. 3H, step 416) when powder (particulate matter 50) will be supplied via the filling tube into the subsequently expanded (molded) parison 350.

| Element | description |
|---|---|
| Extruder | . . . |
| Parison-1 | . . . |
| Top Mold | . . . |
| Bottom Mold | . . . |
| Pull Gripper | still grasping the bottom of the parison |
| Needle | moved downward, out of fill tube (optional) |

This step (retract needle) may be considered to be optional. In the next steps of first blow (FIG. 3G, step 414) and powder drop (FIG. 3H, step 416), it may be advantageous (but not necessary) to position the needle out of the way.

Notice that the cavity 332 in the bottom mold 330 corresponds to only a bottom portion (such as the lower approximately two-thirds) of the mixing chamber 23. The portion of the parison 350 expanded (FIG. 3G, step 414) into this cavity may be referred to as the "cup". A benefit of "partitioning" the mixing chamber 23 in this manner (rather than the bottom mold forming the entire mixing chamber) is to maintain the interface between the bottom of the cavity 332 in the bottom mold 330 and the top of the cavity 322 in the top mold 320 (best viewed in FIG. 3K) approximately equal to the cross-section (such as diameter, but not restricted to circular) of the parison, as extruded.

First Blow

FIG. 3G shows (step 414) the bottom mold 330 closing on the pulled (lengthened) parison 350. This may shear the parison at the top of the pull gripper 340. Air pressure may then be delivered (from the compressor 306) via the fill tube 314 to expand the parison into the left and right halves of the bottom mold. The parison wall will of course become thinner as it expands into the cavity 332 of the bottom mold. As discussed above, the wall thickness of the parison can be controlled by supporting (either pulling or resisting gravity pull) the parison during extrusion. As mentioned above, extrusion may have already stopped (and the parison may continue to be elongated) before performing this blow.

Figure 3I:
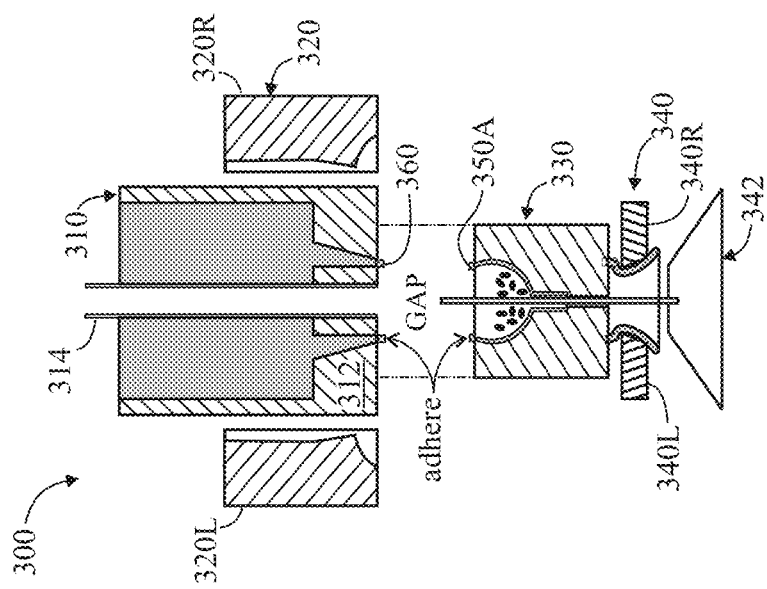
Figure 3L:
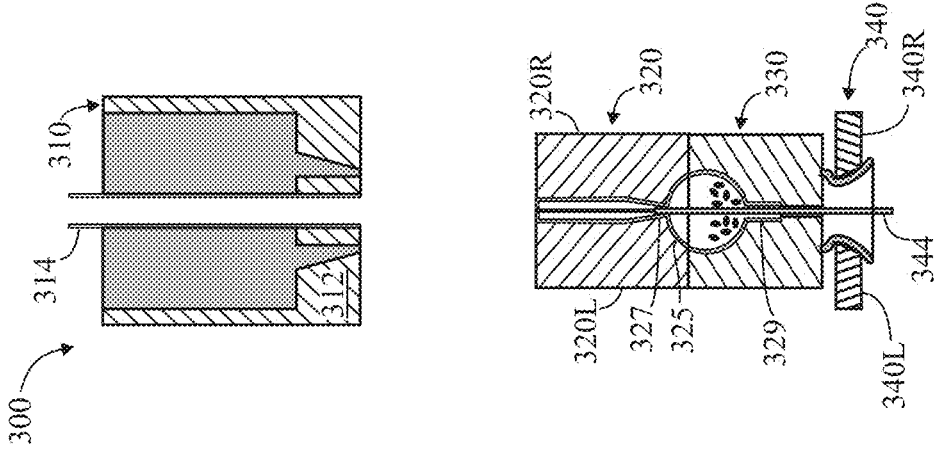
Figure 3K:
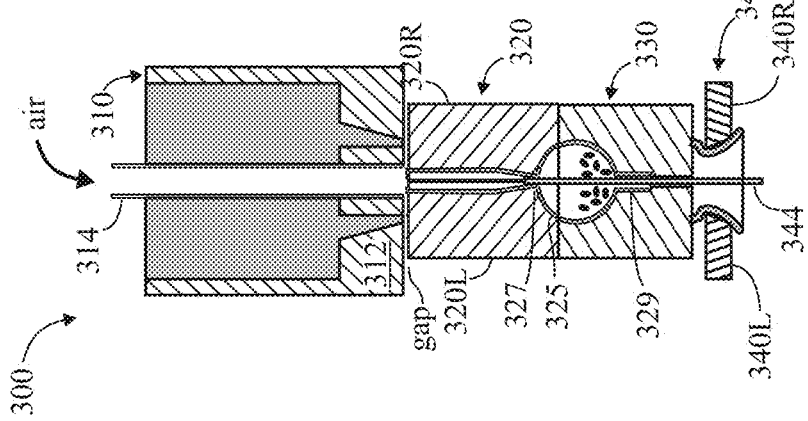

This will form the "cup" 323, or bottom portion of the mixing chamber 23 (and discharge port 29 at the bottom of the mixing chamber 23), and a "first needle crimp location" 329 (for discharge port 29) may be formed (see FIG. 3K).

The air blow should occur substantially immediately after the mold closes, before the parison has an opportunity to cool and harden.

When the bottom mold closes, note that the top of the cavity 332 may be approximately the same size and cross-sectional shape (such as diameter) as the parison. A bottom portion of the parison may be pinched around the needle 344.

As an alternative to a two-piece mold closing on the parison after it is pulled, the parison may be pulled within (through) an already-closed two-piece mold or a one-piece mold. In any case, the blow may begin when a sufficient length of parison has been pulled that is sufficient to fill (when expanded) the cavity in the mold.

| Element | description |
|---|---|
| Extruder | (extrusion stopped) air blow through fill tube |
| Parison-1 | expands into bottom mold cavities, and ruptures in gap |
| Top Mold | . . . |
| Bottom Mold | closes on parison |
| Pull Gripper | still grasping the bottom of the parison |
| Needle | . . . |

Note that there may (or may not) be a small gap (not shown) between the top of the bottom mold and the bottom of the extruder. During the blow, such a gap may allow (or cause) the previously-extruded, now-molded parison 350 to rupture (shear, break, separate from the extruder). Alternatively, a knife could be used to cut off the parison, but is generally not necessary.

Alternatively, if it is desired to avoid rupture of the parison in the gap, such as to proceed with further extrusion (as discussed below), the bottom mold may be securely affixed to the extruder, such as with any suitable locking mechanism (such as wedges, T-shaped pins and slots, and the like) to avoid having a gap and rupturing of the parison.

Assuming that a rupture has occurred during the first blow, it may be useful to have some material from the parison 350 remaining after the blow, extending slightly out from the top of the bottom mold 330. As described below (FIG. 3I, step 418), a subsequent parison (Parison-2) may be joined (adhered, attached) to the exposed top end 350A of molded Parison-1, so that lowering the bottom mold (with molded Parison-1 in it) will pull on Parison-2 as it is being extruded, serving as an "ersatz" pull gripper or otherwise supporting the subsequent parison (Parison-2) as it is being extruded.

Powder Drop (Cup Fill)

FIG. 3H shows (step 416) that after the first blow is completed, a measured quantity of powder ("sand", particulate matter 50), illustrated as black dots, may be delivered (dropped) into the cup 323, via the fill tube 314.

| Element | description |
| --- | --- |
| Extruder | powder delivery through fill tube |
| Parison-1 | . . . |
| Top Mold | . . . |
| Bottom Mold | . . . |
| Pull Gripper | (optional) still grasping the bottom of Parison-1 |
| Needle | . . . |

During this step, the needle 344 may vent/evacuate air from the cup, facilitating the powder drop. (Alternatively, the cup could be filled with a liquid, again the needle acting as a vent.) (The fill tube 314 functions as means for filling the part being molded before it is removed from the mold apparatus.) The pull gripper 340 may be removed once bottom mold 330 has closed on (and has "control" of) the parison 350.

Alternatively, the powder drop could take place away from the extruder by moving the molds 320 and 330 to an auxiliary filler (not shown), then returning the molds 320 and 330 to the extruder of Parison-1 or a difference extruder (not shown) for extruding and molding Parison-2. Performing the powder drop separately ("off line") may avoid limitations which may be associated with performing the powder drop through the extruder for Parison-1.

Second Extrusion

FIG. 3I shows (step 418) beginning (resuming) extruding a second parison (Parison-2), starting with plastic material 360 being extruded on top of the bottom mold 330, more particularly onto the top of the previously molded part (cup) 323 and being stuck (adhered, attached, joined, welded) thereto. (Plastic material, such as from supply 304, is shown in the extruder in this and the next few figures, but may be different than the plastic material used for Parison-1.) More particularly, a gap ("GAP") is shown, greatly exaggerated for illustrative clarity, between the top of the bottom mold 330 and the bottom of the extruder 310. (The bottom mold 330 is shown "exploded" away from the extruder 310.)

As discussed above, if during the first blow (FIG. 3G, step 414), such a gap may cause the parison 350 to rupture, leaving the top end (350A) of the expanded (into the mold 330) parison exposed at the top of the mold 330. The bottom end of the new parison 360 (Parison-2) being extruded may be warm and can stick (be joined or "welded", adhered) to this exposed plastic material at the top end of the expanded, typically cooled Parison-1 350.

Then, in a next step (FIG. 3J, step 420), the second parison 360 can be pulled by moving the bottom mold 330 away from the extruder 310 (or vice-versa), in much the same manner as which the pull gripper 340 was used to pull the first parison 350 (FIG. 3E, step 410), with similar effect and for similar objectives. Generally referred to as "supporting", in this manner the thickness of the parison 360 can be controlled, increased or decreased, tailored as desired.

| Element | description |
| --- | --- |
| Extruder | commencing extruding plastic material |
| Parison-1 | has been expanded, and may be separated (ruptured at the top) |
| Parison-2 | starts forming, and may be attached to the top of Parison-1 |
| Top Mold | still open |
| Bottom Mold | still closed (acts as puller, in next step) |
| Pull Gripper | (optional) still grasping the bottom of the parison |
| Needle | moved up (to "final" position) |

Note that the cavity 322 in the top mold defines a top portion 325 of the cup and an inlet port 327 (compare 27) for the mixing chamber 23 (323 plus 325) of the micro-abrasive blasting device 75.

Prior to starting the second extrusion, the needle 344 may be moved upward, so as to be above a "second needle crimp location" 327 (see FIG. 3K) at the top of the upper portion 325 of the cup, such as for forming the inlet port 27 of the micro-abrasive blasting device 75. (The needle will thus be in its "final" position as shown in FIG. 3N for the device 75.) Recall that the first needle crimp location was formed (FIG. 3G, step 414) at the bottom of the cup 323.

Note that the external geometry (diameter, shape, etc.) of the needle 344 will determine the inside geometry of Parison-2 at the second needle crimp location, when the second blow occurs (FIG. 3K, step 422).

Note that, at this stage, the bottom mold 320 has closed on and grasped the needle 344 so that the needle gripper 342 may release needle 344 and move away, such as to fetch another needle for a subsequent part.

Note that the plastic material in the extruder may be the same or a different plastic composition (or color) than that which was used for the first parison. Or, a colorant (for example) could be added to the plastic material in the extruder after the first extrusion and before the second extrusion. Alternatively, a different extruder may be used for the second parison (360), such as by moving the molds 320 and 330 to the new extruder (not shown).

Pull Parison-2

FIG. 3J shows (step 420) that the bottom mold 330 may be moved downward to pull more of second parison (Parison-2) 360 from the extruder 310. (Conversely, the extruder may be moved up with the bottom mold stationary.) This should continue until the second parison is sufficiently long to be molded by the top mold 320 in the next step (FIG. 3K, step 422).

Here the bottom mold is no longer shown "exploded" away from the extruder, and it can be seen that the bottom of Parison-2 is "welded" to the top of Parison-1. The needle 344 extends between the two parisons 350 and 360.

During this pull, the bottom mold 330 acts as the puller (compare pull gripper 340), and the pull rate may be controlled to facilitate having a thicker parison wall at the "second needle crimp location" 327 (see FIG. 3N).

| Element | description |
| --- | --- |
| Extruder | . . . |
| Parison-1 | . . . |
| Parison-2 | lengthened (pulled) |
| Top Mold | . . . |
| Bottom Mold | moved down, serves as puller for Parison-2 |
| Pull Gripper | . . . |
| Needle | . . . |

Note that with a constant feed rate, Parison-1 350 may be thicker than Parison-2 360, by pulling more slowly for Parison-1. Generally, this is intended to accommodate the larger expansion of Parison-1 into the bottom mold 330, in contrast with a smaller expansion of the Parison-2 into the top mold 320. This "recipe" is specific to the micro-abrasive blasting device 75. Numerous other alternatives are possible.

Recall that that the extruder may have already been turned off (no more extrusion, feed rate substantially ZERO) before the parison 360 is completely formed, such as when it is 90% formed, the remaining lengthening of the parison 360 being effected by pulling only.

Second Blow

FIG. 3K shows (step 422) the top mold 320 closing on Parison-2 360. Then air pressure is delivered via the fill tube 314 to expand the wall of Parison-2 360 into the left and right halves of the top mold. This may form the top portion 325 of the mixing chamber (23), the delivery conduit (30), and the second crimp point (inlet port 27).

As with the first blow, air pressure should commence immediately after the mold closes. And, a gap between the top of the mold 320 and the extruder 310 may allow the Parison-2 360 to rupture, and become separated from the extruder during the second blow.

| Element | description |
| --- | --- |
| Extruder | (extrusion stopped) air blow through fill tube |
| Parison-1 | . . . |
| Parison-2 | expands into top mold cavities |
| Top Mold | closes on Parison-2 |
| Bottom Mold | . . . |
| Pull Gripper | . . . |
| Needle | released from gripper 342 which moves away |

Notice that, at this stage, the molding of the part 75 is essentially complete, and the needle gripper 342 may release the needle 344 and move away, such as to fetch another needle for a subsequent part. FIG. 3K illustrates the first needle crimp location 329 and the second needle crimp location 327. Note that the top end of the needle is in the second needle crimp location 327 (and compare inlet port 27 in FIG. 2).

Separation

FIG. 3L shows (step 424) that the molds 320 and 330 may now be moved away from the extruder 310 (or vice-versa). In the steps subsequent to the first blow (FIG. 3G, step 414), the bottom mold 330 may (or may not) remain clamped around Parison-1 350.

| Element | description |
| --- | --- |
| Extruder | separated from the molds |
| Parison-1 | in closed bottom mold |
| Parison-2 | in closed top mold |
| Top Mold | closed on delivery conduit (30) (and top of mixing chamber 23) |

| Element | description |
| --- | --- |
| Bottom Mold | remains closed on cup (remainder of mixing chamber 23) |
| Pull Gripper | (optional) still closed on bottom of Parison-1 |
| Needle | extends from within inlet port (27), through mixing chamber (23) |

Strip Plastic

FIG. 3M shows (step 426) that the pull gripper 340, which is still closed, moves down to strip residual plastic (flash) from the needle 344. The extruder 310 is not shown in this figure, which is enlarged, for illustrative clarity. This step is optional as stripping can occur as a separate (secondary) process.

| Element | description |
| --- | --- |
| Extruder | . . . |
| Parison-1 | . . . |
| Parison-2 | . . . |
| Top Mold | . . . |
| Bottom Mold | . . . |
| Pull Gripper | moves down to strip plastic from needle |
| Needle | being stripped of excess plastic |

Remove Part

FIG. 3N shows (step 428) that the molds 320 and 330 are opened to release the molded part 75 (compare FIG. 2), which may now be removed (and further processing steps, not shown, performed). This figure is also enlarged, without extruder 310, without needle gripper 340, for illustrative clarity. The molding apparatus 300 is now ready to move to start position (FIG. 3A, step 402) to form a subsequent part.

| Element | description |
| --- | --- |
| Extruder | . . . |
| Parison-1 | . . . |
| Parison-2 | . . . |
| Top Mold | opened |
| Bottom Mold | opened |
| Pull Gripper | opened |
| Needle | . . . |

Comment(s)

An exemplary blow-molding technique has been described, in the context of a particular part (micro-abrasive blasting device 75), and has some steps that may be specific to that part (such as the steps involving positioning the needle 314, filling the cup, etc.). In a more general sense, an "overall process" may be considered to be a blow-mold process that starts with parison extrusion (FIG. 3C, step 406; FIG. 3I, step 418), continues through the steps involving pulling and/or supporting the parison(s) (FIGS. 3D,E, steps 408, 410; FIG. 3J, step 420), and concludes with the steps of closing the mold(s) and blowing the parison(s) (FIG. 3G, step 414; FIG. 3K, step 422) and mold separation/part removal (such as FIG. 3N, step 428). The steps of position needle (FIG. 3B, step 404), retract needle (FIG. 3F, step 412), powder drop (FIG. 3H, step 416), move needle (FIG. 3I, step 418), separation (FIG. 3L, step 424) and strip plastic (FIG. 3M, step 426) are more specific, and ancillary to the "overall process".

From this perspective, some of the broad, novel features of the "overall process" may include supporting, including controlling, guiding and pulling a parison as it is being extruded forming a parison atop a previously formed parison controlling parison thickness, such as by controlling a rate at which the parison is being pulled relative to the rate at which it is being extruded.

controlling internal dimensions of the part installing an element or device in or extending from the part, during molding (such as the needle 314, or a valve, or a stopper)

in the midst of the overall process, stopping and performing a procedure not related to blow molding, such as filling a partially completed part (FIG. 3H, step 416)

in the context of a procedure such as filling a partially completed part, venting air from within the part to facilitate the filling And, some of the more specific (or optional) features of the "overall process" may include manipulating the position of the needle 344 during various stages of the overall process, to facilitate various steps.

forming portions of the part with a thicker wall, such as for the pinch points 327, 329

The techniques described above illustrate forming a blow-molded part having at least two different portions (Parison-1, Parison-2) resulting from two different extrusions and blows. In the example set forth above, one piece (portion) is atop and welded to the other. Stopping and re-starting extrusion (without the first piece rupturing) was discussed as a way to avoid the need for welding. Control over thickness was discussed. The two pieces can also be formed from different types of plastic, such as a relatively flexible plastic and a relatively rigid plastic. In a process where rupture has occurred, and extrusion starts anew, a separate extruder could be used, for example by transporting the first piece (Parison-1, molded) to a second extruder station. Different color plastics may be used. If using only one extruder, it is possible to modify the plastic composition as it is being extruded for a given parison or from parison-to-parison, such as by introducing a catalyst, or stiffening material. At some point in the process, it may be necessary to re-heat the already blown portion(s) of the part. Numerous variations may become evident based on the teachings set forth herein.

Some Alternate Embodiments, Options, Aspects and Variations

A number of the techniques discussed above may be performed in the context of fewer (such as one) or more molds (mold sets). And, it should be clear to someone skilled in the art that there are a number of other possibilities, some of which will now be described.

The process can be performed without inserting a needle (344) from below. The bottom of the molded part may be permanently sealed. Or, another component such as a valve or a removable plug, or a plunger could be inserted in the bottom, such as for a molded syringe.

With a needle (such as 344) or the like inserted, the needle can be used to deliver material (solids, aerosols, gases, liquids) to the inside of the part being molded. And, the needle can be extracted after performing the delivery (not remaining with the resulting molded part).

As an alternative to using the pull gripper 340 for the parison 350, an element (not shown) to which the end of the parison could be stuck could be used to support and pull the parison 350, in a manner similar to how the bottom end of the parison 360 may be adhered to the top 350A of the previously-formed parison 350 (FIG. 3I, step 418). Such an element may be a sacrificial element, to be disposed of (or re-used) after serving its purpose, or it may be an element which will become integral with the part, such as brush bristles for forming a brush with a hollow handle.

By dynamically controlling the elongation of the parison, and not relying on gravity pull, the orientation of the apparatus need not be vertical. By inverting the extruder, the additive effect of gravity on parison lengthening can be eliminated. Horizontal extrusion can also be effected, such with the parison supported by a tool inserted in its bore to avoid sagging, and this may be done with or without pulling. Extrusion can be performed at any desired angle.

In FIG. 3J it was shown that the needle 344 extends between the two parisons 350 and 360. For a molded part having two chambers filled with two different materials, a frangible sealing device could be inserted here to allow a user to later allow mixing of the components.

As mentioned above, the thickness of the parison(s) can be controlled locally, for example so that some portions of the molded part may be more rigid than others, such as an end portion being squeezable while another portion is stiff, such as for blow molding an eyedropper.

Figure 5A:
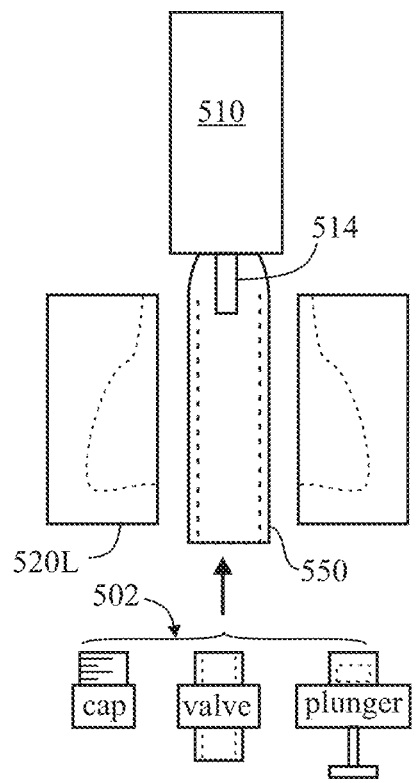
FIG. 5A is an illustration of a blow molded part which may be made using the techniques disclosed herein.

FIG. 5A illustrates that a mechanical element or device 502 may be inserted into the bottom of a parison 550 prior to closing the mold(s) 520L, 520R (and performing the blow). An extruder 510 and fill tube 514 are shown. The device 502 may be a cap, a valve, a plunger, or the like, that becomes combined with (integrated into) the resulting blow-molded part.

As mentioned above, an element such as a mandrel or a tool can be inserted from the bottom of the parison to define an inner surface (control inner dimensions, shape and profile) of the molded part, at that location. The tool could be inflatable. In a similar manner, an element or device may be inserted from the extruder 510 into the top of a parison 550 prior to closing the mold(s) 520L, 520R (and performing the blow). Such a device may be a mandrel or tool for forming (shaping, controlling the dimension of, contouring) the inner surface of the molded part, at that location. This may be useful, for example, for applications where an external connector seals to the internal diameter of the inlet conduit or a plunger for pushing material out.

Blow molded parts other than the micro-abrasive blasting device (75) may be formed by implementing some or selected ones of the steps described above, and further repeating various steps to form more complex parts. Various materials may be used to form the blow molded part, including but not limited to a thermoplastic material selected from a group consisting of: polycarbonate, polyethylene, polyester, polystyrene, polypropylene, polysulfone, polyurethane, or ethylene-vinyl-acetate.

Other parameters can be introduced by suitable (known) mechanisms to the blow molding process, such as ultraviolet (UV), infrared (IR), airflow, increased or decreased temperature, vibration, and the like. Vibration, for example, could be used to assist material flow during powder drop (FIG. 3H, step 416).

Figure 5B:
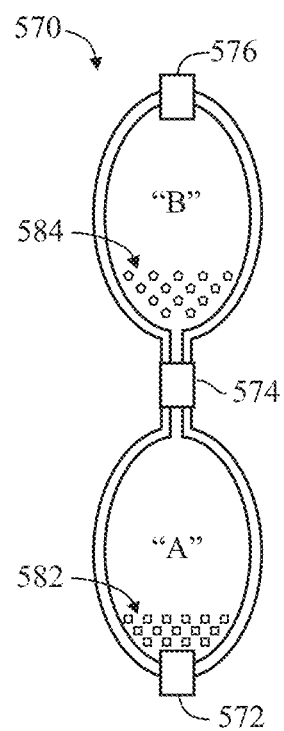
FIG. 5B is an illustration of a blow molded part which may be made using the techniques disclosed herein.

FIG. 5B shows (schematically) a blow molded part 570 having two chambers "A" and "B", as representative of a blow molded part having two or more chambers. Each of the chambers may be formed by a separate parison and molded using a separate mold. Different plastic material may be used to form the chambers.

A mechanical element or device 572 may be molded into an end (bottom, as viewed) of the of the chamber "A". A mechanical element or device 574 may extend between the two chambers "A" and "B". A mechanical element or device 576 may be molded into the end (top, as viewed) of the chamber "B". The mechanical elements 572, 574 and 576 may be any of the elements mentioned herein, such as needle, cap, valve, plunger or the like.

A material 582 may be introduced into the chamber "A". A material 584 may be introduced into the chamber "B". The element or device 576 may be movable (or frangible) so that in one position (or state) it prevents mixing of the materials 582 and 584 and in another position it allows mixing of the materials 582 and 584. The materials 582 and 584 may be solids (such as particles, powder or granules), liquids or gases, or combinations thereof.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), based on the disclosure(s) set forth herein.

What is claimed is:

1. Method of blow molding a part, comprising extruding a parison;
   characterized by supporting the parison as it is being extruded;
   wherein supporting the parison comprises one or more of:
   sticking the parison to an element which will become integral with the part; and
   sticking the parison to a previously formed portion of the part.
2. The method of claim 1, wherein supporting the parison further comprises one or more of:
   pulling on at least a portion of the parison as it is being extruded;
   guiding the parison as it is being extruded;
   manipulating a position of at least the free end of the parison as it is being extruded;
   controlling the emergence of the parison from the extruder; and
   resisting the elongation of the parison due to gravity.
3. The method of claim 1, further comprising:
   controlling a wall thickness of the parison as it is being extruded.
4. The method of claim 1, further comprising:
   inserting an element or device or tool into the parison prior to molding.
5. The method of claim 4, wherein the element or device or tool comprises one of:
   a cap, valve, plunger or the like; and
   a tool for defining an inner surface of the part.
6. The method of claim 1, further comprising:
   during blow molding the part, after molding the parison, and before the part is completed, filling the molded parison with a liquid or powder material.
7. The method of claim 1, further comprising:
   during blow molding the part, evacuating air or material from within the part.
8. The method of claim 1, further comprising:
   controlling a rate at which the parison is being pulled independent of and relative to the rate at which it is being extruded.
9. The method of claim 8, further comprising:
   before the parison has reached a desired length, reducing the rate of extrusion to substantially zero while continuing pulling the parison.
10. Method of blow molding a part, comprising:
    extruding a first parison; and
    inflating the first parison into a cavity of a first mold, thereby forming a molded part;
    characterized by:
    subsequently joining an end of a new parison onto the previously molded part and extruding the new parison; and
    inflating the second parison into a second mold.
11. The method of claim 10, further comprising:
    prior to extruding the second parison, filling the molded part with a material.
12. The method of claim 10, further comprising:
    disposing an element between the first and second parisons.
13. The method of claim 10, further comprising:
    disposing an element, device or tool in at least one of the first and second parisons.
14. The method of claim 10, further comprising:
    using different plastic materials for the first and second parisons.
15. An overall process for blow molding a part, comprising:
    extruding a first portion of a parison;
    stopping extruding;
    molding the first portion of the parison without rupturing the first portion of the parison; and
    after molding, resuming extruding a second portion of the parison.
16. The process of claim 15, further comprising:
    before resuming extruding, filling the molded first portion of the parison.
17. The process of claim 15, further comprising:
    molding the second portion of the parison.
18. Blow molding method comprising:
    providing a mold;
    extruding a parison having a length and a thickness; and
    controlling the thickness of the parison locally along its length, as it is being extruded by resisting or pulling on the parison as it is being extruded;
    wherein the thickness of the parison is controlled to be thicker at positions along its length where it needs to expand more into the mold and thinner at positions along its length where it needs to expand less into the mold.
19. The method of claim 18, further comprising:
    controlling the rate at which the parison develops independently of the rate at which it is being extruded.
20. The method of claim 18, wherein:
    the thickness of the parison is increased to provide increased wall thickness, including completely filled, at selected positions of a resulting molded part.
21. The method of claim 18, further comprising
    filling the parison before it is removed from the molding apparatus.
22. The method of claim 18, further comprising:
    gripping or grasping the parison as it is being extruded.
23. Method of blow molding a part, comprising:
    providing a mold; and
    extruding a parison; and
    controlling a wall thickness of the parison locally along its length, as it is being extruded so that the wall thickness of the parison is controlled to be thicker where it needs to expand more into the mold by one or more of:

gripping or grasping or attaching to the parison as it is being extruded; and supporting, pulling on or resisting the parison as it is being extruded.

\* \* \* \* \*